United States Patent
Rampalli et al.

(10) Patent No.: US 11,453,275 B2
(45) Date of Patent: Sep. 27, 2022

(54) GARNISH STRUCTURE FOR LOWER DOOR

(71) Applicants: Hyundai Motor Company, Seoul (KR); Kia Motors Corporation, Seoul (KR)

(72) Inventors: Sudhir Rampalli, Hyderabad (IN); Ki Hyun Cho, Hwaseong-si (KR); Chung Hwa Jung, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 39 days.

(21) Appl. No.: 17/021,220

(22) Filed: Sep. 15, 2020

(65) Prior Publication Data

US 2021/0170843 A1 Jun. 10, 2021

(30) Foreign Application Priority Data

Dec. 6, 2019 (KR) .................. 10-2019-0161210

(51) Int. Cl.
| | |
|---|---|
| *B60J 5/10* | (2006.01) |
| *B60J 5/02* | (2006.01) |
| *B60R 19/18* | (2006.01) |
| *B60R 19/42* | (2006.01) |

(52) U.S. Cl.
CPC .............. *B60J 5/107* (2013.01); *B60J 5/02* (2013.01); *B60J 5/102* (2013.01); *B60R 19/18* (2013.01); *B60R 19/42* (2013.01)

(58) Field of Classification Search
CPC . B60J 5/0472; B60J 5/103; B60J 5/102; B60J 5/02; B60J 5/107; B60R 19/28; B60R 19/42; B60R 19/18

USPC ............. 293/118, 128, 137; 296/146.8
See application file for complete search history.

(56) References Cited

U.S. PATENT DOCUMENTS

| | | | | |
|---|---|---|---|---|
| 4,592,580 A * | 6/1986 | Stanganelli | ............ | B60R 19/18 267/33 |
| 4,807,915 A * | 2/1989 | Shyi | ........................ | B60R 19/36 267/139 |
| 5,037,148 A * | 8/1991 | Kennedy | ................. | B60R 13/04 293/128 |
| 5,431,463 A * | 7/1995 | Chou | ...................... | B60R 13/04 293/110 |
| 5,971,451 A * | 10/1999 | Huang | .................... | B60R 19/18 293/102 |
| 6,217,090 B1 * | 4/2001 | Berzinji | .................. | B60R 19/28 293/106 |

(Continued)

FOREIGN PATENT DOCUMENTS

KR 100383943 B1 5/2003

*Primary Examiner* — Jason S Morrow
(74) *Attorney, Agent, or Firm* — Slater Matsil, LLP

(57) ABSTRACT

A garnish structure includes a garnish unit configured to be located on a surface of a lower door and to perform impact absorption and load support, wherein the garnish unit includes a first layer region configured to absorb energy, and a second layer region configured to withstand a collision. The garnish unit further includes a garnish panel forming an outer surface of the garnish unit, a first impact member formed inside the garnish panel, an absorbing member located in the first layer region, a spring member located inside the absorbing member, a second impact member formed inside the first impact member, and a damping spring located in the second layer region.

20 Claims, 3 Drawing Sheets

(56) References Cited

U.S. PATENT DOCUMENTS

| | | | |
|---|---|---|---|
| 7,097,222 B2* | 8/2006 | Ran | B60R 19/28 |
| | | | 293/102 |
| 7,252,313 B2* | 8/2007 | Browne | B29C 33/308 |
| | | | 293/128 |
| 8,113,555 B2* | 2/2012 | Faruque | B60R 19/34 |
| | | | 293/118 |
| 8,292,345 B2* | 10/2012 | Voyer | B60J 5/104 |
| | | | 296/26.08 |
| 9,731,658 B2* | 8/2017 | Kowalski | B60R 9/042 |
| 9,909,347 B2* | 3/2018 | Warburton | B60J 5/103 |
| 10,906,488 B2* | 2/2021 | Santiago | B60R 13/043 |
| 2007/0057525 A1* | 3/2007 | Yui | E05D 5/062 |
| | | | 296/55 |
| 2010/0019541 A1* | 1/2010 | Browne | B60R 13/043 |
| | | | 296/202 |
| 2011/0227353 A1* | 9/2011 | Nagwanshi | F16F 7/12 |
| | | | 293/137 |
| 2020/0172041 A1* | 6/2020 | Dix | B60R 19/40 |
| 2021/0170844 A1* | 6/2021 | Cho | B60J 5/103 |

* cited by examiner

FIG. 5]
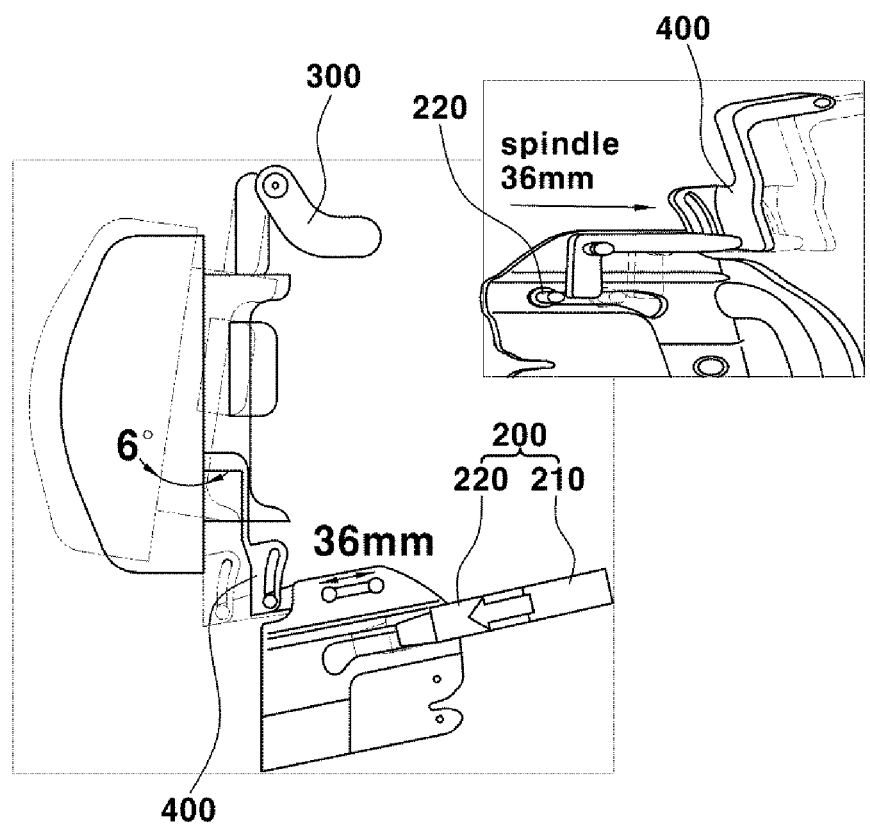

GARNISH STRUCTURE FOR LOWER DOOR

CROSS-REFERENCE TO RELATED APPLICATIONS

This application claims priority to Korean Patent Application No. 10-2019-0161210, filed on Dec. 6, 2019, which application is hereby incorporated herein by reference.

TECHNICAL FIELD

The present disclosure relates to a garnish structure for a lower door.

BACKGROUND

In general, a tailgate is an opening/closing door that is installed at the rear end of a wagon-type vehicle, a van, a recreational vehicle, or the like in order to load cargo into the rear portion of the vehicle body.

A tailgate is installed to facilitate access by a driver to a cargo compartment formed in the cabin of the vehicle. A tailgate installed at the rear end of the vehicle enables not only convenient loading and unloading of cargo into and out of a cargo compartment but also boarding and deboarding of passengers through the rear portion of the vehicle.

Further, in the case of a future vehicle, tailgates may be mounted not only to the rear portion of the vehicle but also to the front portion of the vehicle, thereby enabling loading and unloading of cargo and boarding and deboarding of passengers through both the front portion and the rear portion of the vehicle.

However, in the case in which a tailgate is configured to open perpendicularly, a gap is formed between the external ground and the tailgate, thus causing inconvenience in boarding and deboarding. To solve this problem, a tailgate may be configured such that one end thereof comes into contact with the external ground when opened. Even in this case, however, the contact area with the external ground is small, and thus the tailgate is not capable of stably supporting a load, and is vulnerable to impacts.

Meanwhile, a bumper may be disposed on the lower end of a tailgate to absorb impacts occurring in the event of a collision of a vehicle. However, since there is a limitation on the extent to which the bumper can absorb impacts, there is the need to devise a separate structure for minimizing an impact load.

The above information disclosed in this Background section is only for enhancement of understanding of the background of the disclosure and therefore it may contain information that does not form the related art that is already known in this country to a person of ordinary skill in the art.

Korean Patent Registration No. 10-0383943 discloses subject matter related to the subject matter of the present disclosure.

SUMMARY

Embodiments of the present disclosure solve problems associated with the related art. The present disclosure relates to a garnish structure for a lower door. Particular embodiments relate to a garnish structure for a lower door, which is capable of minimizing injury to an occupant and damage to a vehicle in the event of a collision and supporting a load when an occupant gets into or out of the vehicle through the door.

An embodiment of the present disclosure provides a garnish structure for a lower door, which is configured such that a garnish unit is divided into two regions, namely a first layer region and a second layer region, which are connected to each other via an impact member and an energy-absorbing member.

Another embodiment of the present disclosure provides a garnish structure for a lower door, which is configured such that, when the lower door is fully opened, a tilted garnish unit contacts the external ground.

The features of the present disclosure are not limited to the above-mentioned features, and other features not mentioned herein will be clearly understood by those skilled in the art from the following description, and will become apparent with reference to the embodiments of the present disclosure. In addition, features of the present disclosure can be accomplished by the components described in the appended claims and combinations thereof.

A garnish structure for a lower door for achieving features of the present disclosure includes the following configurations.

In one aspect, an embodiment of the present disclosure provides a garnish structure for a lower door, the garnish structure including a garnish unit located on one surface of the lower door to perform impact absorption and load support, the garnish unit including a first layer region configured to absorb energy and a second layer region configured to withstand a collision.

In a preferred embodiment, the garnish unit may include a garnish panel configured to form the outer surface of the garnish unit, a first impact member formed inside the garnish panel, an absorbing member located in the first layer region, a spring member located inside the absorbing member, a second impact member formed inside the first impact member, and a damping spring located in the second layer region.

In another preferred embodiment, the first impact member may include a first mountain portion and a first valley portion continuously formed, and the spring member may be in contact with the first valley portion.

In still another preferred embodiment, the second impact member may include a second mountain portion and a second valley portion continuously formed, one end of the damping spring may be in contact with the first mountain portion, and the opposite end of the damping spring may be in contact with the second mountain portion.

In yet another preferred embodiment, the spring member and the damping spring may be alternately located at positions corresponding to the first mountain portion and the first valley portion.

In still yet another preferred embodiment, the first mountain portion, the first valley portion, the second mountain portion, and the second valley portion may have flat portions.

In a further preferred embodiment, the first impact member and the second impact member may be made of high strength steel or advanced high strength steel.

In another further preferred embodiment, the garnish structure may further include a driving unit configured to apply driving force to the garnish unit, a garnish hinge configured to connect the upper portion of the garnish unit to the lower door, and a garnish lever connected to the lower portion of the garnish unit, and the garnish unit may be tilted from the lower door in a manner such that the lower end thereof is rotated about the garnish hinge.

In still another further preferred embodiment, the driving unit may include an actuator configured to apply driving force and a spindle configured to be moved in a longitudinal direction by the actuator, and when the spindle extends in the longitudinal direction, at least a portion of the garnish unit may be tilted to a predetermined angle.

Other aspects and preferred embodiments of the disclosure are discussed infra.

It is understood that the term "vehicle" or "vehicular" or other similar term as used herein is inclusive of motor vehicles in general such as passenger automobiles including sports utility vehicles (SUVs), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of embodiments of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIG. 5 is a view illustrating the tilted state of the garnish structure for a lower door according to an embodiment of the present disclosure.

It should be understood that the appended drawings are not necessarily to scale, presenting a somewhat simplified representation of various preferred features illustrative of the basic principles of the disclosure. The specific design features of embodiments of the present disclosure as disclosed herein, including, for example, specific dimensions, orientations, locations, and shapes, will be determined in part by the particular intended application and use environment.

In the figures, reference numbers refer to the same or equivalent parts of embodiments of the present disclosure throughout the several figures of the drawings.

DETAILED DESCRIPTION OF ILLUSTRATIVE EMBODIMENTS

Hereinafter, embodiments of the present disclosure will be described in detail with reference to the accompanying drawings. The present disclosure may, however, be embodied in many different forms, and should not be construed as being limited to the embodiments set forth herein. Rather, these embodiments are provided so that the disclosure will be more thorough and complete, and will more fully convey the scope of the disclosure to those skilled in the art.

The terms "part", "unit", and "member" used in the specification mean units for processing at least one function or operation, and may be implemented using hardware components, software components, or combinations thereof.

Further, the term "first layer region" used in the specification is an energy-absorbing region that is formed between a garnish panel 130 and a first impact member 140, and the term "second layer region" is a collision-withstanding region that is formed between the first impact member 140 and a second impact member 170. The first layer region no and the second layer region 120 may be sequentially arranged.

Furthermore, the term "door" used in the specification includes both a front door and a rear door, and the following description in the specification will focus on one end of the door.

Figure 1:
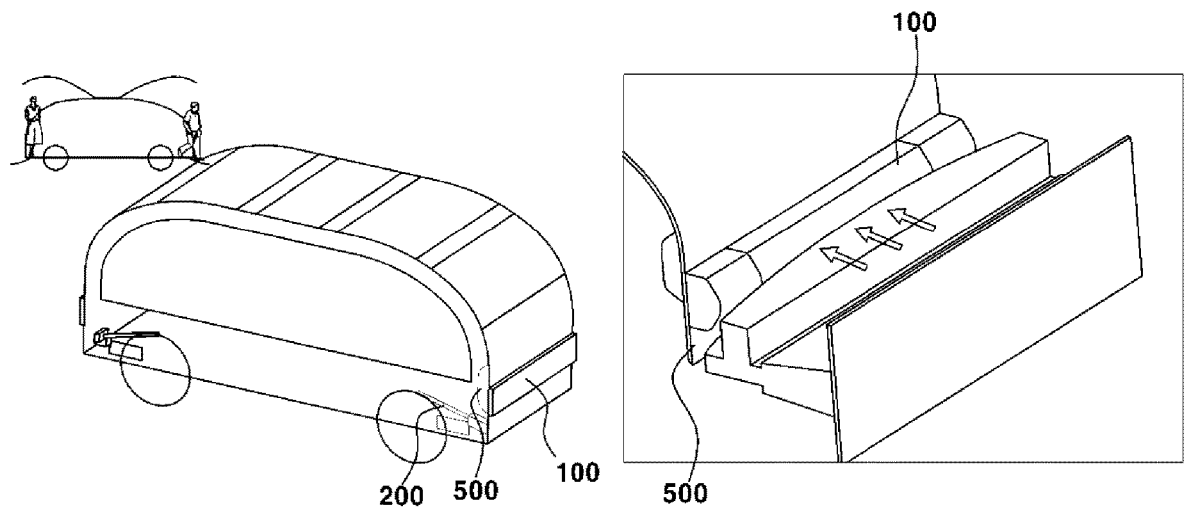
FIG. 1 is a view illustrating the closed state of a lower door having a garnish structure therefor according to an embodiment of the present disclosure.

FIG. 1 is a view illustrating the closed state of a lower door having a garnish structure therefor according to an embodiment of the present disclosure.

A door may include an upper door, which is configured such that, with respect to a first end thereof that is adjacent to the roof of the vehicle, a second, opposite end thereof, which is close to the rear portion of the vehicle, is rotated and opened in a height direction, and a lower door, which is provided adjacent to the second end of the upper door. The lower door may be rotated and opened with respect to the lower surface of the vehicle body.

When the lower door is fully opened, an occupant may get into or out of the vehicle. More preferably, when an occupant gets into or out of the vehicle, a garnish unit 100 located on one surface of the lower door may come into contact with the external ground, thereby securing convenience and support stability when getting into or out of the vehicle.

The garnish unit 100 may be located on one surface of the lower door, and at least a portion of the lower end thereof may be tilted from the lower door. More preferably, the garnish unit 100 may include a center portion and side portions formed at the two opposite ends thereof. When the garnish unit 100 is tilted, only the side portions thereof may be tilted, or only the center portion thereof may be tilted. In another embodiment, the center portion and the side portions of the garnish unit 100 may be tilted together.

A driving unit 200 may be located adjacent to one end of the garnish unit 100, and may provide driving force to the garnish unit 100. More preferably, the driving unit 200 may tilt the garnish unit 100. The driving unit 200 may be extended in a longitudinal direction in response to the pressure with which the garnish unit 100 is tilted by the user, and may apply tension to the garnish unit 100. When tension is applied to the garnish unit 100 by the driving unit 200, the lower end of the garnish unit 100 may be tilted to a predetermined angle relative to the lower door.

Further, when the lower door is fully opened through the application of additional driving force by the driving unit 200, the tilted garnish unit 100 may lie substantially parallel to the ground, thereby increasing support stability.

Figure 2:
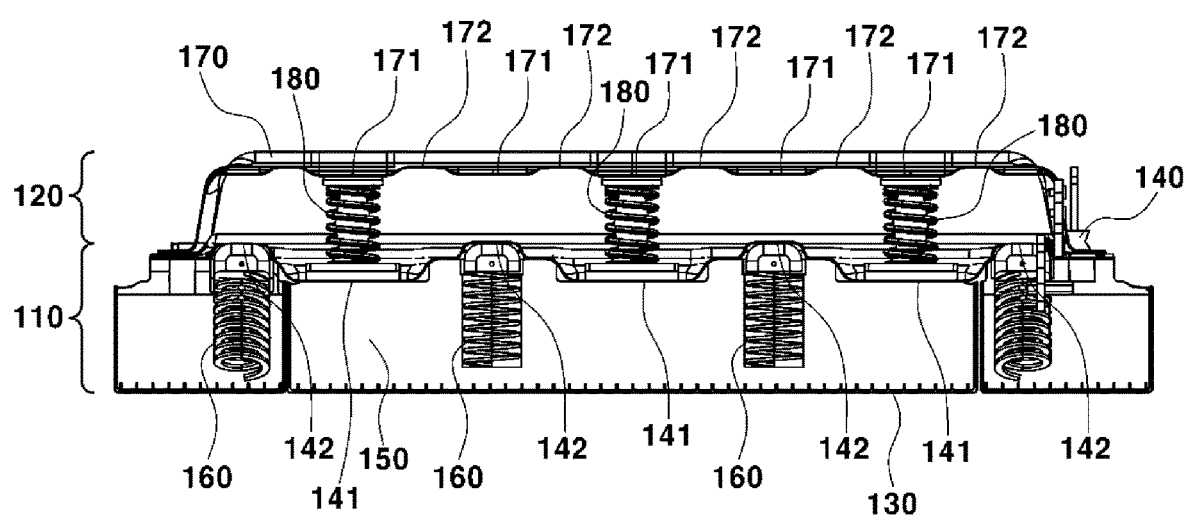
FIG. 2 is a cross-sectional view of the garnish structure for a lower door according to an embodiment of the present disclosure.
Figure 3:
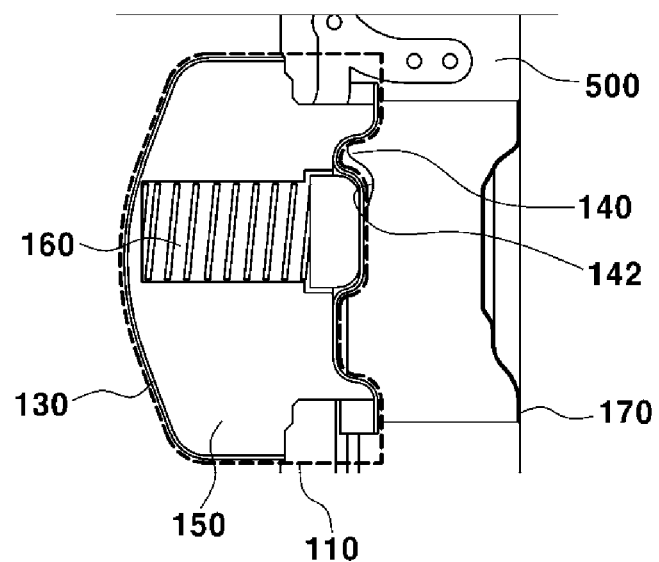
FIG. 3 is a cross-sectional view of a first layer region of the garnish structure for a lower door according to an embodiment of the present disclosure.
Figure 4:
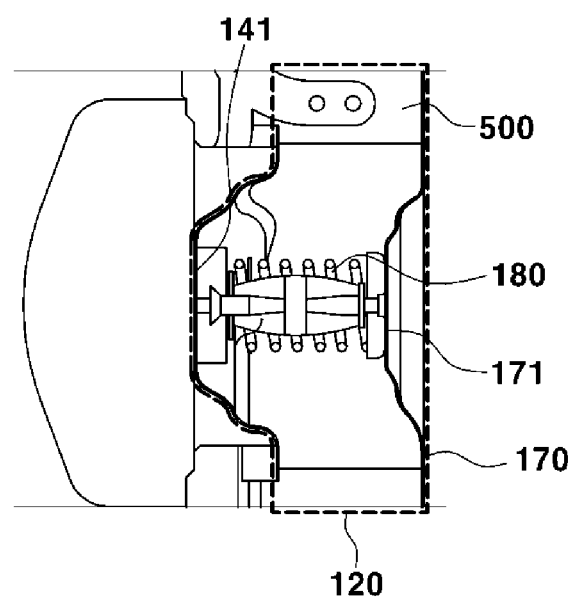
FIG. 4 is a cross-sectional view of a second layer region of the garnish structure for a lower door according to an embodiment of the present disclosure.

FIG. 2 is a cross-sectional view of the garnish structure for a lower door according to an embodiment of the present disclosure, FIG. 3 is a cross-sectional view of the first layer region of the garnish structure for a lower door according to an embodiment of the present disclosure, and FIG. 4 is a cross-sectional view of the second layer region of the garnish structure for a lower door according to an embodiment of the present disclosure.

Referring to FIGS. 2 to 4, the garnish structure for a lower door according to an embodiment of the present disclosure may include the garnish unit 100, which is located on one surface of the lower door and performs impact absorption and load support. The garnish unit 100 may include the first layer region 110 for absorbing energy and the second layer region 120 for withstanding a collision.

In addition, the garnish unit 100 may include a garnish panel 130 forming the outer surface of the garnish unit 100, a first impact member 140 formed inside the garnish panel 130, an absorbing member 150 located in the first layer region no, a spring member 160 located inside the absorbing member 150, a second impact member 170 formed inside the first impact member 140, and a damping spring 180 located in the second layer region 120.

When the lower door is in a closed state, the garnish unit 100 may perform impact absorption and load support in the event of a collision of the front portion or the rear portion of the vehicle. The garnish unit 100 may be located on the front side or the rear side of the lower door and may form the furthest protruding portion of the outer surface of the vehicle, thereby functioning as a primary protective member in the event of a collision of the vehicle.

The garnish unit 100 may include the first layer region no for absorbing energy and the second layer region 120 for withstanding a collision. The first layer region 110 may include the garnish panel 130, the absorbing member iso, and the spring member 160. The second layer region 120 may include the first impact member 140, the second impact member 170, and the damping spring 180.

The garnish panel 130 may extend in the width direction of the vehicle, and may form the outer surface of the garnish unit 100. The garnish panel 130 may be the furthest protruding portion of the vehicle, thus functioning as a primary protective member in the event of a collision of the front portion or the rear portion of the vehicle. Further, when the lower door is fully opened, the garnish panel 130 may contact the external ground. The garnish panel 130 may have a curved shape in order to secure support stability when contacting the external ground. In addition, the garnish panel 130 may be formed of a reinforced plastic material in order to prevent damage attributable to repeated collisions and contact. However, the present disclosure is not limited thereto.

The spring member 160, the first impact member 140, the damping spring 180, and the second impact member 170 may be sequentially stacked inside the garnish panel 130. In addition, the absorbing member 150 for absorbing energy may be formed between the garnish panel 130 and the first impact member 140, thereby alleviating impacts in the event of a collision of the vehicle or when the garnish panel 130 contacts the external ground due to opening of the lower door and increasing support stability when an occupant gets into or out of the vehicle.

The first impact member 140 may be formed so as to extend in the width direction of the vehicle inside the garnish panel 130. In addition, the first impact member 140 may include first mountain portions 141 and first valley portions 142, which are continuously formed. More preferably, the first impact member 140 may be configured such that the first mountain portions 141 and the first valley portions 142 are formed alternately in the entire surface of the first impact member 140.

The first mountain portions 141 and the first valley portions 142 may have flat portions. Thereby, the first impact member 140 may have relatively high strength, and may stably support the spring member 160 and the damping spring 180. Each of the flat portions may be formed between the ending point of a corresponding one of the first mountain portions 141 and the starting point of a corresponding one of the first valley portions 142, or may be formed between the ending point of a corresponding one of the first valley portions 142 and the starting point of a corresponding one of the first mountain portions 141.

The second impact member 170 may be formed so as to extend in the width direction of the vehicle inside the first impact member 140. In addition, the second impact member 170 may include second mountain portions 171 and second valley portions 172, which are continuously formed. More preferably, the second impact member 170 may be configured such that the second mountain portions 171 and the second valley portions 172 are formed alternately in the entire surface of the second impact member 170.

The second mountain portions 171 and the second valley portions 172 may have flat portions. Thereby, the second impact member 170 may have relatively high strength, and may stably support the damping spring 180. Each of the flat portions may be formed between the ending point of a corresponding one of the second mountain portions 171 and the starting point of a corresponding one of the second valley portions 172, or may be formed between the ending point of a corresponding one of the second valley portions 172 and the starting point of a corresponding one of the second mountain portions 171.

The first impact member 140 and the second impact member 170 may be made of high strength steel (HSS) or advanced high strength steel (AHSS). AHSS may conceptually include ultra HSS (UHSS). The first impact member 140 and the second impact member 170 may be connected to each other through a welding joint method. The first impact member 140 and the second impact member 170 may also be connected to the inner panel of the vehicle body through a welding joint method.

The absorbing member 150 may be located in the first layer region no to absorb energy. The garnish panel 130 and the absorbing member 150 may be coupled to each other in a heat staking method. The spring member 160 may be formed in a plural number inside the absorbing member 150. More preferably, the spring member 160 may be formed to be in contact with the first valley portions 142 and the inner surface of the garnish panel 130.

The spring member 160 may serve to absorb collision energy in the event of a collision of the vehicle and to support a load in a distributed manner when an occupant gets into or out of the vehicle. The spring member 160 may be fastened to the garnish panel 130 through a screw joint method. More preferably, each spring member 160 may be formed on a respective one of the two opposite side portions of the garnish unit wo and two spring members 160 may be formed on the center portion of the garnish unit 100.

The damping spring 180 may absorb energy in response to a collision. The damping spring 180 may be formed in a plural number such that one end of each of the damping springs 180 is in contact with a corresponding one of the first mountain portions 141 and the opposite end of each of the damping springs 180 is in contact with a corresponding one of the second mountain portions 171. More preferably, one end of each damping spring 180 may have a predetermined area so as to be coupled to the inner surface of the first impact member 140 through a bolt joint method, and the opposite end of each damping spring 180 may be in contact with and fixed to the opposite end of the second impact member 170.

The spring members 160 and the damping springs 180 may be alternately disposed such that the spring members 160 are located at positions corresponding to the first valley portions 142 of the first impact member 140 and the damping springs 180 are located at positions corresponding to the first mountain portions 141 of the first impact member 140. The elastic force of the spring members 160 and the collision energy damping force of the damping springs 180 may be balanced, and accordingly, the first layer region no and the second layer region 120 may efficiently realize collision damping and load support.

In the event of a collision of the vehicle, the spring members 160 may primarily absorb collision energy. In the case in which the amount of energy that is applied exceeds the amount that can be absorbed by the spring members 160, the damping springs 180 may absorb the collision energy. In another embodiment of the present disclosure, the damping springs 180 may primarily absorb collision energy, and when the amount of energy that is applied exceeds the amount that can be absorbed by the damping springs 180, the spring members 160 may absorb the collision energy.

FIG. 5 is a view illustrating the tilted state of the garnish structure for a lower door according to an embodiment of the present disclosure.

Referring to FIG. 5, the garnish structure for a lower door according to an embodiment of the present disclosure may further include a driving unit 200 configured to apply driving force to the garnish unit 100, a garnish hinge 300 configured to connect the upper portion of the garnish unit 100 to the lower door, and a garnish lever 400 connected to the lower portion of the garnish unit 100. The garnish unit wo may be tilted from the lower door in a manner such that the lower end thereof is rotated about the garnish hinge 300.

The driving unit 200 may include an actuator 210 configured to apply driving force and a spindle 220 configured to be moved in the longitudinal direction by the actuator 210. When the spindle 220 extends in the longitudinal direction, at least a portion of the garnish unit 100 may be tilted to a predetermined angle.

The garnish hinge 300 may be formed on the upper portion of the garnish unit 100 to connect the garnish unit 100 to the lower body. One or more garnish hinges 300 may be formed on the upper portion of the garnish unit 100 so as to be spaced apart from each other. The lower end of the garnish unit 100 may be rotated about the garnish hinge 300, and may be tilted from the lower door.

The garnish lever 400, which is connected to the driving unit 200, may be formed on the lower portion of the garnish unit 100. The garnish lever 400 may be formed at a position corresponding to the driving unit 200. When the driving unit 200 applies tension, the garnish lever 400 may tilt the garnish unit 100 to a predetermined angle. One end of the garnish lever 400 may be connected to the driving unit 200, and the opposite end thereof may be connected to the rear surface of the garnish unit 100.

The angle to which the garnish unit 100 is tilted with respect to the lower door may be 4° to 8°, and may preferably be 6°. When the lower door is fully opened, it is possible to enable the garnish unit 100 to contact the external ground without a gap therebetween by adjusting the tilting angle of the garnish unit 100, thereby increasing support stability.

When one end of the spindle 220 moves 33 mm to 39 mm, e.g., 36 mm, it may apply tension to one end of the garnish lever 400, and the opposite end of the garnish lever 400 may tilt the garnish unit wo. In this case, the tilting angle of the garnish unit wo may be 4° to 8° with respect to the lower door, and may preferably be 6°.

The driving unit 200 may extend in the longitudinal direction, and may apply driving force to the lower door and the garnish unit 100. More preferably, the driving unit 200 may include the actuator 210 configured to apply driving force and the spindle 220 configured to be moved in the longitudinal direction by the actuator 210. The spindle 220 may be extended in the longitudinal direction when the actuator 210 applies driving force thereto.

In summary, the garnish structure for a lower door according to embodiments of the present disclosure is configured such that the garnish unit is divided into two regions, namely the first layer region and the second layer region, which are connected to each other via the impact member and the energy-absorbing member 150, and such that the absorbing member 150 effectively absorbs and alleviates impact energy in the event of a collision of the rear portion of the vehicle, thereby preventing damage to the vehicle and ensuring occupants' safety.

As is apparent from the above description, the garnish structure for a lower door according to embodiments of the present disclosure has the following effects.

A garnish unit may be divided into two regions, namely a first layer region and a second layer region, which are connected to each other via an impact member and an energy-absorbing member, and the absorbing member may effectively absorb and alleviate impact energy in the event of a collision of the rear portion of a vehicle, thereby preventing damage to the vehicle and ensuring the occupants' safety.

In addition, when a lower door is fully opened, the tilted garnish unit may contact the external ground, thereby improving the convenience of an occupant and increasing support stability.

The foregoing detailed description of the present disclosure is merely illustrative. The foregoing content is intended to illustrate and describe exemplary embodiments of the present disclosure, and the present disclosure may be used in various other combinations, modifications, and environments. That is, the present disclosure may be modified or changed within the scope of the concept of the present disclosure disclosed herein, the scope equivalent to the foregoing content, and/or the scope of technology or knowledge known in the art. The embodiments described above are intended to describe the best mode for implementing the technical idea of the present disclosure, and various modifications required for specific applications and uses of the present disclosure are also possible. Thus, the foregoing detailed description is not intended to limit the present disclosure to the disclosed modes. The appended claims should be interpreted as also including other modes.

What is claimed is:

1. A garnish structure comprising:
   a garnish unit configured to be located on a surface of a lower door and to perform impact absorption and load support,
   wherein the garnish unit comprises:
     a first layer region configured to absorb energy; and
     a second layer region configured to withstand a collision, and
   wherein the garnish unit is supported on an external ground when the lower door is opened.

2. The garnish structure of claim 1, wherein the garnish unit further comprises:
   a garnish panel forming an outer surface of the garnish unit;
   a first impact member formed inside the garnish panel;
   an absorbing member located in the first layer region;
   a spring member located inside the absorbing member;
   a second impact member formed inside the first impact member; and a damping spring located in the second layer region.

3. The garnish structure of claim 2, wherein the first impact member comprises a first mountain portion and a first valley portion continuously formed, wherein the spring member is in contact with the first valley portion.

4. The garnish structure of claim 3, wherein the first mountain portion and the first valley portion have flat portions.

5. The garnish structure of claim 2, wherein the second impact member comprises a second mountain portion and a second valley portion continuously formed, wherein a first end of the damping spring is in contact with a first mountain portion, and a second, opposite end of the damping spring is in contact with the second mountain portion.

6. The garnish structure of claim 5, wherein the second mountain portion and the second valley portion have flat portions.

7. The garnish structure of claim 2, wherein the spring member and the damping spring are alternately located at positions corresponding to a first mountain portion and a first valley portion.

8. The garnish structure of claim 2, wherein the first impact member and the second impact member are made of high strength steel or advanced high strength steel.

9. The garnish structure of claim 1, further comprising:
a driving unit configured to apply a driving force to the garnish unit;
a garnish hinge configured to connect an upper portion of the garnish unit to the lower door; and
a garnish lever connected to a lower portion of the garnish unit,
wherein the garnish unit is configured to be tilted from the lower door such that a lower end of the garnish unit is configured to be rotated about the garnish hinge.

10. The garnish structure of claim 9, wherein the driving unit comprises:
an actuator configured to apply the driving force; and
a spindle configured to be moved in a longitudinal direction by the actuator,
wherein, when the spindle extends in a longitudinal direction, at least a portion of the garnish unit is configured to be tilted to a predetermined angle.

11. A vehicle comprising:
a vehicle body;
a door connected to the vehicle body, the door comprising an upper door and a lower door; and
a garnish unit located on a surface of the lower door, wherein the garnish unit comprises:
a first layer region;
a second layer region;
a garnish panel forming an outer surface of the garnish unit;
a first impact member formed inside the garnish panel;
an absorbing member located in the first layer region;
a spring member located inside the absorbing member;
a second impact member formed inside the first impact member; and
a damping spring located in the second layer region.

12. The vehicle of claim 11, wherein the first impact member comprises a first mountain portion and a first valley portion continuously formed, wherein the spring member is in contact with the first valley portion.

13. The vehicle of claim 12, wherein the second impact member comprises a second mountain portion and a second valley portion continuously formed, wherein a first end of the damping spring is in contact with the first mountain portion, and a second, opposite end of the damping spring is in contact with the second mountain portion.

14. The vehicle of claim 13, wherein the first mountain portion, the first valley portion, the second mountain portion and the second valley portion have flat portions.

15. The vehicle of claim 11, wherein the spring member and the damping spring are alternately located at positions corresponding to a first mountain portion and a first valley portion.

16. The vehicle of claim 11, wherein the first impact member and the second impact member are made of high strength steel or advanced high strength steel.

17. The vehicle of claim 11, further comprising:
a driving unit configured to apply driving force to the garnish unit;
a garnish hinge connecting an upper portion of the garnish unit to the lower door; and
a garnish lever connected to a lower portion of the garnish unit,
wherein the garnish unit is configured to be tilted from the lower door such that a lower end of the garnish unit is configured to be rotated about the garnish hinge.

18. The vehicle of claim 17, wherein the driving unit comprises:
an actuator configured to apply driving force; and
a spindle configured to be moved in a longitudinal direction by the actuator,
wherein, when the spindle extends in a longitudinal direction, at least a portion of the garnish unit is configured to be tilted to a predetermined angle.

19. A garnish unit configured to be located on a surface of a lower door of a vehicle, the garnish unit comprising:
a first layer region;
a second layer region;
a garnish panel forming an outer surface of the garnish unit;
a first impact member formed inside the garnish panel, the first impact member comprising a first mountain portion and a first valley portion continuously formed;
an absorbing member located in the first layer region;
a spring member located inside the absorbing member, wherein the spring member is in contact with the first valley portion;
a second impact member formed inside the first impact member, the second impact member comprising a second mountain portion and a second valley portion continuously formed; and
a damping spring located in the second layer region, wherein a first end of the damping spring is in contact with the first mountain portion, and a second, opposite end of the damping spring is in contact with the second mountain portion.

20. The garnish unit of claim 19, further comprising:
a driving unit configured to apply a driving force to the garnish unit, the driving unit comprising an actuator configured to apply the driving force, and a spindle configured to be moved in a longitudinal direction by the actuator, wherein, when the spindle extends in a longitudinal direction, at least a portion of the garnish unit is configured to be tilted to a predetermined angle;
a garnish hinge configured to connect an upper portion of the garnish unit to the lower door; and
a garnish lever connected to a lower portion of the garnish unit.

* * * * *